July 17, 1956     F. C. GODFREY ET AL     2,755,169
PRODUCTION OF SODIUM CARBONATE
Filed Aug. 13, 1954     2 Sheets-Sheet 1
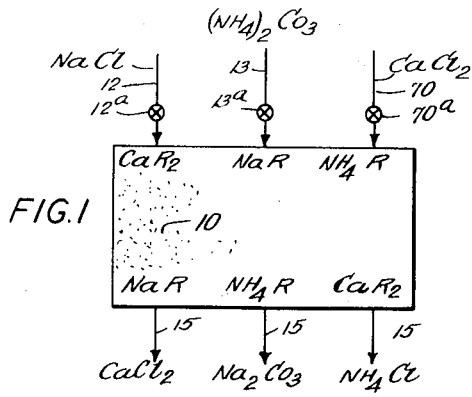
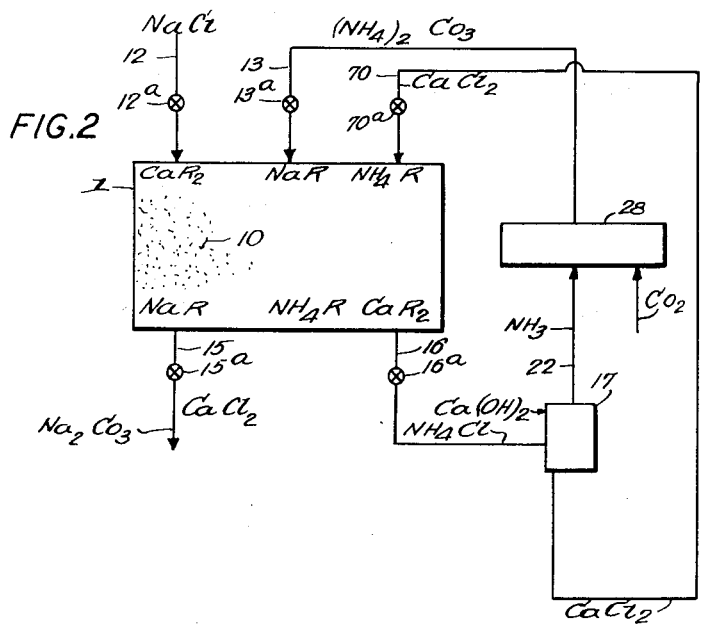
*INVENTORS*
*GEORGE MILLER*
*F. CHASE GODFREY*

July 17, 1956 F. C. GODFREY ET AL 2,755,169
PRODUCTION OF SODIUM CARBONATE
Filed Aug. 13, 1954 2 Sheets-Sheet 2

INVENTORS
GEORGE MILLER
F. CHASE GODFREY

United States Patent Office 2,755,169
Patented July 17, 1956

2,755,169

PRODUCTION OF SODIUM CARBONATE

Frank C. Godfrey, Boston, Mass., and George Miller, Tarrytown, N. Y.

Application August 13, 1954, Serial No. 464,990
(Filed under Rule 47(a) and 35 U. S. C. 116)

5 Claims. (Cl. 23—63)

This invention relates to the production of alkali metal carbonates, particularly sodium carbonate, by an ion exchange process and is an improvement of patent application of George Miller, Serial No. 150,379, filed March 18, 1950, now abandoned, and particularly the application of Miller and Godfrey, Serial No. 153,384, filed April 1, 1950, now abandoned.

For a detailed description of the economic importance of the alkali metal carbonates produced according to this invention and a general explanation of the phenomena occurring in the process of ion exchange, reference is made to the above mentioned applications.

Essentially in the present application we substitute calcium chloride in place of an alkali earth hydroxide in a three-stage ion exchange process, i. e. two stages of regeneration as disclosed in said patent applications.

The present invention has the advantage that it substitutes the feed, passage through and effluent from the exchanger system of solutions in place of sludges or precipitates in a three-stage exchange process. Also calcium chloride has an advantage over sodium chloride in replacing an ammonium ion in a two-stage run in that calcium has a higher coefficient of displacement than sodium. Calcium chloride being soluble and ionized gives a high concentration in the effluent ammonium chloride. The calcium chloride in the exchanger run may be also ammoniacal. The effluent containing chloride ions are treated with milk of lime to recover ammonia and to regenerate the calcium chloride solution, both for recirculation and reuse in the exchange system as regenerants.

These features will be more fully explained in the following description of our present invention and in the drawings showing apparatus for performing the process and which are intended to be illustrative and not to limit the scope to which the invention is entitled.

In the drawings:

Fig. 1 is a schematic drawing of cation exchange apparatus for performing the process of the invention;

Fig. 2 is a schematic drawing showing the apparatus and process of Fig. 1 in combination with recovery and recirculation apparatus and process.

General discussion

Figure 3:
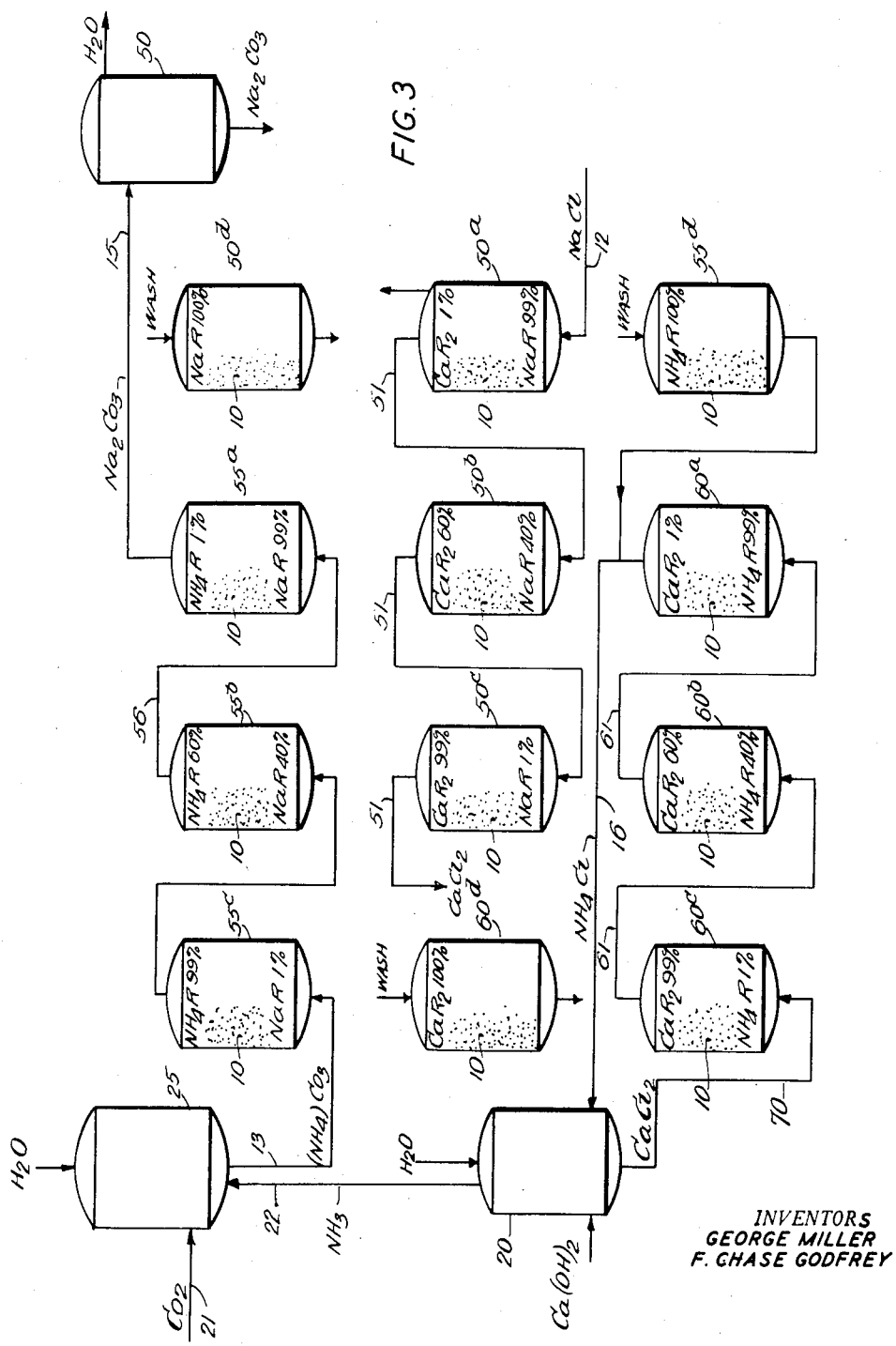
Fig. 3 is a schematic drawing of an embodiment of commercial apparatus for performing the process of the invention.

Our invention is applicable to the use of cation exchangers, and suitable high capacity exchangers may be selected for use in our process according to readily available data.

The cation exchange material may be any one of a number of suitable and well-known cation exchange materials, preferably a synthetic resin having the desired properties and herein designated R.

A suitable high capacity cation exchanger is selected which is capable of exchanging the cations of the compositions involved in the ion exchange reactions of which the desired alkali metal carbonate is the end product. Among the recently developed synthetic resin cation exchangers from which may be selected an exchanger best for the particular process involved, those most satisfactory are, for instance, the sulphonated copolymers of phenol and formaldehyde and the like which are available on the market under the trade name "Amberlite" such as the cation exchangers "Amberlite" IR-105, a sulphonic acid type, "Amberlite" IRC-50, a carboxylic acid type, and "Amberlite" 120, a sulphonic acid type. Throughout the process of this invention a resin cation exchanger will usually be in the form of a metallic resinate, for instance, a sodium resinate NaR, or an ammonium resinate $(NH_4)R$, or a calcium resinate $CaR_2$ which resinates are interchangeable in form as the process takes place according to the invention. Such resinates may be purchased in the metallic resinate form desired.

While this invention includes the manufacture of any alkali metal carbonate from any soluble salt of the metal of such carbonate, it will be particularly described as applied in the manufacture of sodium carbonate, $Na_2CO_3$ and potassium carbonate, $K_2CO_3$ from solutions of chlorides or sulphates of sodium and potassium and solutions containing an ionizable carbonate or bicarbonate of ammonia or an organo amine having a dissociation constant between about $10^{-6}$ and $10^{-2}$, in which process the carbonate may be regenerated, recovered and re-used cyclically in the process as by treatment with calcium hydroxide (milk of lime) $Ca(OH)_2$ and carbon dioxide $CO_2$.

In this description the term "production run" will be applied to that part or stage of ion exchange in which the desired end product alkali carbonate is produced, and the term "regeneration run" will be applied to one or more parts or stages of ion exchange in which, after becoming exhausted in a production run, the ion exchanger or part of it is prepared for another production run in a cycle.

Since in our present process regeneration of the ion exchanger with respect to the production run occurs in two separate stages during which two separate solutions are sequentially run through the exchanger, the term "regeneration run" is also intended to mean the two separate runs or stages during which the exchanger which has been exhausted in the production run during which the end product alkali metal carbonate is produced is brought back to the form in which it has become regenerated and made ready for use again in the production run.

Sequential or simultaneous alternate continual production and regeneration runs in an ion exchanger include sequential production and regeneration runs in a single batch or batch part of an exchanger, or the use of an ion exchanger system in which one or more parts are being used in a production run, while one or more of its other parts are simultaneously being used in at least two regeneration runs, with a progressive interchange between the batch parts, resulting in continuous end production from some part of the system. This may also include draining and washing stages during the interchange between production and one or more stages of regeneration.

Simultaneous production and regeneration may be further considered as a series of solutions introduced to and flowing through an exchanger bed or system, and being withdrawn in a chemically changed form, with the directions of flow and the points of introduction and withdrawal continuously moving relative to the exchanger bed or system, or the bed of exchanger material may be bodily moved relative to the points of introduction and withdrawal of the various solutions involved, all of which will be discussed in further detail.

The carbonate ion may be recovered from one of the by-product effluents of the process and re-used in the ion exchange cycle as will be explained.

Illustrative embodiment

In the drawings are illustrated apparatus and process for performing the invention with the use of calcium chloride CaCl₂. The exchange reactions for the production of sodium carbonate are as follows:

$$(NH_4)_2CO_3 + 2NaR \rightarrow Na_2CO_3 + 2NH_4R$$

$$CaCl_2 + 2NH_4R \rightarrow 2NH_4Cl + CaR_2$$

$$2NaCl + CaR_2 \rightarrow CaCl_2 + 2NaR$$

*External reactions*

$$2NH_4Cl + Ca(OH)_2 \xrightarrow[\text{vacuum}]{\text{heat or}} CaCl_2 + 2NH_3\uparrow + 2H_2O$$

$$2NH_3 + CO_2 + H_2O \rightarrow (NH_4)_2CO_3$$

Any soluble alkali earth salt may be substituted for calcium chloride in the above reactions, for instance, magnesium nitrate Mg(NO₃)₂, magnesium chloride MgCl₂, magnesium sulphate MgSO₄ and calcium bromide CaBr₂.

Fig. 1 is a schematic illustration of a tank 1 containing a bed of cation exchanger 10. Commencing with a calcium resinate CaR₂ form of exchanger 10 sodium chloride NaCl is passed through the exchanger from the line 12 regenerating the exchanger to a sodium form NaR and producing an effluent calcium chloride CaCl₂ through the line 15. Then ammonium carbonate (NH₄)₂CO₃ is passed through the sodium form NaR of exchanger 10 from the line 13 exhausting the exchanger to an ammonium resinate form NH₄R and producing the end product sodium carbonate Na₂CO₃.

Calcium chloride CaCl₂, is then introduced to the ammonium resinate form NH₄R exchanger in a second stage of regeneration, thus regenerating the exchanger 10 back to the calcium resinate CaR₂ form ready for the introduction of the sodium chloride NaCl in the cycle as described, and producing as an effluent ammonium chloride NH₄Cl in solution. Fig. 2 shows the apparatus and process of Fig. 1 with additional apparatus in which, when the calcium chloride CaCl₂ is passed through the exchanger, the ammonium chloride NH₄Cl is led through a line 16 and valve 16a, the valve 15a being closed. The ammonium chloride NH₄Cl is treated with calcium hydroxide Ca(OH)₂ in ammonia recovery apparatus of any suitable type 17 producing calcium chloride CaCl₂ which may then be reintroduced and recirculated in the exchanger through the line 70, and free ammonia NH₃ which is passed through the line 22 into suitable absorber apparatus 28 to which carbon dioxide CO₂ is added through the line 21 to form the ammonium carbonate (NH₄)₂CO₃ flowing back through the line 13. Valves 12a, 13a and 70a are indicated to show means for controlling sequential passage of fluids into the exchanger.

Fig. 3 shows a preferred form of commercial apparatus and process. The sodium chloride NaCl is passed from the line 12 through a series of tanks 50a, 50b and 50c connected in series by a line 51. These tanks contain batches of exchanger 10 in progressive proportions which have become exhausted to a calcium resinate form CaR₂, and which are being regenerated back to the sodium resinate from NaR.

Another series of tanks 55a, 55b and 55c containing a sodium form NaR of resin exchanger 10 are connected together in series by a line 56. From the tank 25 and the line 13 is passed ammonium carbonate (NH₄)₂CO₃ exhausting the resinate to the ammonium form NH₄R and producing as an end product through the line 15 the sodium carbonate Na₂CO₃.

A series of tanks 60a, 60b, and 60c are interconnected in series by the line 61, and they contain batches of exchanger 10 in progressive proportions of the form ammonium resinate NH₄R to which the exchanger has become exhausted. Calcium chloride CaCl₂ is passed from the line 70 from the tank 20 through these tanks 60a, 60c by the line 61. This regenerates the exchanger back to the calcium resinate form CaR₂ and produces as an effluent ammonium chloride NH₄Cl which is passed through the line 16 to ammonia recovery apparatus of any suitable type 20, where it is treated with calcium hydroxide Ca(OH)₂ producing calcium chloride CaCl₂ which may be then reintroduced and recirculated through the exchanger tanks 60a-c through the line 70, and free ammonia NH₃ which is passed through the line 22 into suitable absorber apparatus 25 where carbon dioxide CO₂ is added through the line 21 to form the ammonium carbonate (NH₄)₂CO₃ which is then reintroduced through the line 13 back into the production run through the tanks 55a-55c.

At preferably equal intervals of time, the length of which depends upon the capacity of the exchanger, a tank becoming substantially exhausted in one of the runs is exchanged for a tank, the exchanger of which has been regenerated as to that run, the tanks, therefore, moving from one series to another countercurrently with washing stages in between.

For instance, the tank 50a has been substantially regenerated to a sodium form NaR exchanger, and at a following time interval will replace the tank 50d which has previously been regenerated and is now being washed, and the latter will move into the series line 56 alongside the tank 55a. When the tank 55c has become completely exhausted of its sodium form NaR exchanger, it will replace the tank 55d which is now being washed, and the latter will move into series line 61 alongside the tank 60a where it will gradually become regenerated to a calcium form CaR₂ exchanger. As the tank 60c becomes completely regenerated to the calcium resinate CaR₂ form, it will replace the tank 60d which is being washed, and the latter will then move into the series line 51 alongside the tank 50c where it will progressively be regenerated back to the sodium form NaR exchanger.

Each tank moves from the end of one series to the end of the next series progressively in a direction against the direction of flow of the solution through them, i. e. countercurrently, thereby providing continuous production of the end product, and simultaneous regeneration in two stages of the exchanger used in the production run and continuous recovery and regeneration of the ammonium carbonate.

It will be understood that Fig. 3 illustrates one method of progressively moving the points of feed and effluence of the various solutions or precipitates involved relative to the exchanger system so that the batches or beds or parts of the exchange may be continuously regenerated. It will be further understood that these points of feed and effluence can be arranged to move from point to point at spaced distances or that a continuous movement can be arranged. Furthermore, arrangement can be made to move the exchanger beds bodily through the apparatus to accomplish the purpose.

In place of ammonium carbonate, any carbonate or bicarbonate of any organo amine (primary, secondary or tertiary) having a dissociation constant between about $10^{-6}$ and $10^{-2}$ is suitable for use in the present invention. Preferred organo amines are those which have a dissociation constant in the above mentioned range and which have a molecular weight not substantially greater than 170 and a boiling point not substantially greater than 95° C., but this is not essential. Aqueous solutions containing an ionizable carbonate or bicarbonate of one of the group consisting of ammonia and a hydrocarbon amine, having a dissociation constant in the above mentioned range, especially a mono basic lower alkyl amine in which the alkyl group contains from 1 to 10 carbon atoms, are most suitable. For example, aqueous solutions containing an ionizable carbonate salt of ammonia, n-butyl amine, sec-butyl amine, diethyl amine, methyl amine, ethyl amine, isoamyl amine, triethyl amine, trimethyl amine, and di-isopropyl amine are suitable. Although ionizable carbonates and bicarbonates of aralkyl amine, such as benzyl amine can be used in the present invention they are not as suitable as the lower alkyl amine. It is understood that the term "carbonate" as used in the claims hereof includes acid carbonates (bicarbonates).

This application is a continuation-in-part of application Serial No. 176,928 filed August 1, 1950, now forfeited.

We claim:

1. A process of manufacturing an aqueous solution of an alkali metal carbonate which comprises; producing said solution by passing through an alkali metal resinate ion exchanger, an aqueous solution of a carbonate of one of the group consisting of ammonia and an organo amine having a dissociation constant between about $10^{-6}$ and $10^{-2}$, thereby forming one of the group consisting of ammonium resinate ion exchanger and a resinate ion exchanger of said organo amine and producing a first effluent containing said aqueous solution of said alkali metal carbonate, recovering said first effluent containing said alkali metal carbonate solution; regenerating said alkali metal resinate ion exchanger for use to produce more of said alkali metal carbonate solution, by passing through the said one of said ammonium resinate ion exchanger and said resinate ion exchanger of said organo amine, an aqueous solution of calcium chloride, thereby forming a calcium resinate ion exchanger and producing a second effluent containing an aqueous solution of one of the group consisting of ammonium chloride and a chloride of said organo amine, and passing through said calcium resinate ion exchanger an aqueous solution containing the alkali metal cation of said alkali metal carbonate thereby regenerating said alkali metal resinate ion exchanger; and passing more of one of said solutions of ammonium carbonate and carbonate of said organo amine through said regenerated alkali metal resinate ion exchanger to produce more of said alkali metal carbonate solution.

2. The process of claim 1, wherein said second effluent is reacted with calcium hydroxide in water to produce (a) said solution of calcium chloride for passing through said one of said ammonium resinate and resinate of said organo amine, and (b) one of the group consisting of ammonia and organo amine and finally reacting said one of said group consisting of ammonia and organo amine with water and carbon dioxide to produce said solution of said one of the group consisting of said ammonium carbonate and said carbonate of said organo amine for passing through said alkali metal resinate ion exchanger.

3. The process of claim 1, wherein said organo amine comprises a hydrocarbon amine which has a molecular weight not greater than 170 and a boiling point not greater than 95° C.

4. The process of claim 3 wherein said hydrocarbon amine comprises a mono basic alkyl amine, the alkyl radical of which comprises from 1 to 10 carbon atoms.

5. The process of claim 1 wherein said one of said carbonates of ammonia and an organo amine comprises a carbonate of ammonia.

No references cited.